(12) United States Patent
Jones et al.

(10) Patent No.: US 9,321,529 B1
(45) Date of Patent: Apr. 26, 2016

(54) HYBRID MOBILE BUOY FOR PERSISTENT SURFACE AND UNDERWATER EXPLORATION

(71) Applicant: The United States of America, as represented by the Secretary of the Navy, Washington, DC (US)

(72) Inventors: Kevin D. Jones, Seaside, CA (US); Vladimir N. Dobrokhodov, Seaside, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 156 days.

(21) Appl. No.: 14/246,611

(22) Filed: Apr. 7, 2014

Related U.S. Application Data (60) Provisional application No. 61/810,194, filed on Apr. 9, 2013.

(51) Int. Cl.
*B64G 1/00* (2006.01)
*B64C 39/02* (2006.01)
*B64C 27/08* (2006.01)

(52) U.S. Cl.
CPC ............. *B64C 39/02* (2013.01); *B64C 27/08* (2013.01); *B64C 39/022* (2013.01)

(58) Field of Classification Search
CPC ...... B64C 39/02; B64C 39/022; B64C 27/08; B64C 2201/18; B64C 2201/042
USPC ............................................. 441/6, 21; 440/6
See application file for complete search history.

(56) References Cited

U.S. PATENT DOCUMENTS 3,773,278 A 11/1973 Bergunder
4,962,488 A * 10/1990 Dell-Imagine ........... H01Q 1/04
343/709

(Continued)

FOREIGN PATENT DOCUMENTS

EP 2213570 A2 8/2010
WO 2012037174 A2 3/2012
WO 2013024258 A1 2/2013

OTHER PUBLICATIONS

Wikipedia Amphibious Helicopter Page, http://en.wikipedia.org/wiki/Amphibious_helicopter (last accessed Mar. 12, 2014).

(Continued)

*Primary Examiner* — Timothy D Collins
*Assistant Examiner* — Richard G Davis
(74) *Attorney, Agent, or Firm* — Naval Postgraduate School; James B. Potts; Lisa A. Norris (57) ABSTRACT

A hybrid buoy system capable of aerial operation, that in some embodiments includes a wireless communication technology to allow communication with other buoys and/or an external system. In some embodiments, a swarm of buoys may be capable of surface and/or air operation. These buoys may work together to perform collective tasks that individual buoys are not capable of. Buoy swarms may be programmed for cooperative and swarm behaviors for use in a broad spectrum of missions. At least some of the buoys may be configured for specialized sensing, increasing the collective sensing capabilities of the swarm. A mixed, swappable sensor suite may be used to accommodate an array of marine exploration applications, including both military and civilian applications.

16 Claims, 9 Drawing Sheets

(56) References Cited

U.S. PATENT DOCUMENTS

| | | | |
|---|---|---|---|
| 6,270,038 B1 | 8/2001 | Cycon et al. | |
| 6,604,706 B1 | 8/2003 | Bostan | |
| 7,924,654 B1 | 4/2011 | Stottlemyer et al. | |
| 8,220,737 B2 | 7/2012 | Wood et al. | |
| 8,492,692 B2 | 7/2013 | Fisher | |
| 2009/0224099 A1* | 9/2009 | Steele | B64C 39/024 244/1 TD |
| 2011/0226174 A1* | 9/2011 | Parks | B60F 5/02 114/313 |
| 2013/0128689 A1* | 5/2013 | Radman | B63B 22/00 367/4 |

OTHER PUBLICATIONS

GULL UAV Capabilities Page, http://www.warrioraero.com/GULL/capabilities.htm (last accessed Mar. 12, 2014).

"Drowned Drones: When a Multicopter Hits the Water," Eric Cheng, Make:, Jan. 22, 2014, http://makezine.com/magazine/drowned-drones-when-a-multicopter-hits-the-water/ (last accessed Mar. 12, 2014).

"Doing Their Part: Drifter Buoys Provide Ground Truth for Climate Data," Climate.gov, May 16, 2013, http://www.climate.gov/news-features/climate-tech/doing-their-part-drifter-buoys-provide-ground-truth-climate-data (last accessed Mar. 12, 2014).

"Amazon drones: A flying robot may deliver your Christmas gifts in four or five years," Matt McFarland, the Washington Post, Dec. 2, 2013 http://www.washingtonpost.com/blogs/innovations/wp/2013/12/02/amazon-drones-a-flying-robot-may-deliver-your-christmas-gifts-in-four-or-five-years/ (last accessed Mar. 13, 2014).

"Warrior Aero Gull36 unmanned seaplane heads for the open sea," Barnard Microsystems site, http://www.barnardmicrosystems.com/UAV/milestones/sea_plane.html (last accessed Mar. 14, 2014).

* cited by examiner

HYBRID MOBILE BUOY FOR PERSISTENT SURFACE AND UNDERWATER EXPLORATION

CROSS REFERENCE TO RELATED APPLICATION

This application claims the benefit of U.S. Provisional Application Ser. No. 61/810,194, filed on Apr. 9, 2013. The subject matter of this earlier filed application is hereby incorporated by reference in its entirety.

FIELD

The present invention generally relates to surface and underwater monitoring systems, and, more particularly, to hybrid mobile buoys configured for water and/or flight operations.

BACKGROUND

Conventional buoys are configured to float on the surface of a water environment, such as the ocean. Multiple buoys may be used for distributed monitoring. However, these buoys generally are not capable of radio communication with surface vessels or other ground or sea-based systems beyond a relatively short range. Also, these systems tend to be relatively immobile, and solely dependent on ocean currents.

SUMMARY

Embodiments in accordance with the invention provide a hybrid buoy system capable of aerial operation, and, in some embodiments include wireless mesh communication technology. In some embodiments, a "swarm" of buoys may be configured to track underwater objects, or to remain in a desired geographic location. In certain embodiments, at least some of the buoys may have specialized sensing capabilities such that the swarm is capable of accomplishing a broader range of missions than any individual buoy.

In one embodiment, an apparatus includes a buoyant body configured to float on water, a battery, and an array of solar panels and power management circuitry configured to charge the battery. The apparatus also includes a sensor configured to detect underwater objects and at least one propeller or rotor configured to cause the apparatus to fly.

In another embodiment, a system includes a plurality of buoys configured to track movement of underwater objects. At least one of the buoys is configured to fly to communicate with other buoys and an external system.

In yet another embodiment, a method includes detecting an underwater object by a first buoy and communicating, by the first buoy, to a plurality of other buoys that the object was detected. The method also includes flying, by the first buoy or another buoy, to a predetermined height and communicating, by the flying buoy, to an external system that the object was detected.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to mobile communication-enabled buoys that are capable of surface and/or air operation. These buoys may be capable of "swarm" behavior and may work together to perform collective tasks that individual buoys are not capable of. Such buoy swarms may be programmed for cooperative and swarm behaviors for use in a broad spectrum of missions. Further, in some embodiments, at least some of the buoys may be configured for specialized sensing, increasing the collective sensing capabilities of the swarm. In certain embodiments, the hybrid buoys may be produced at relatively low cost (e.g., less than $15,000 each). A mixed, swappable sensor suite may be used to accommodate an array of marine exploration applications, including both military and civilian applications. In certain embodiments, the hybrid buoys may be produced from stock components so overall cost is reduced.

Figure 1:
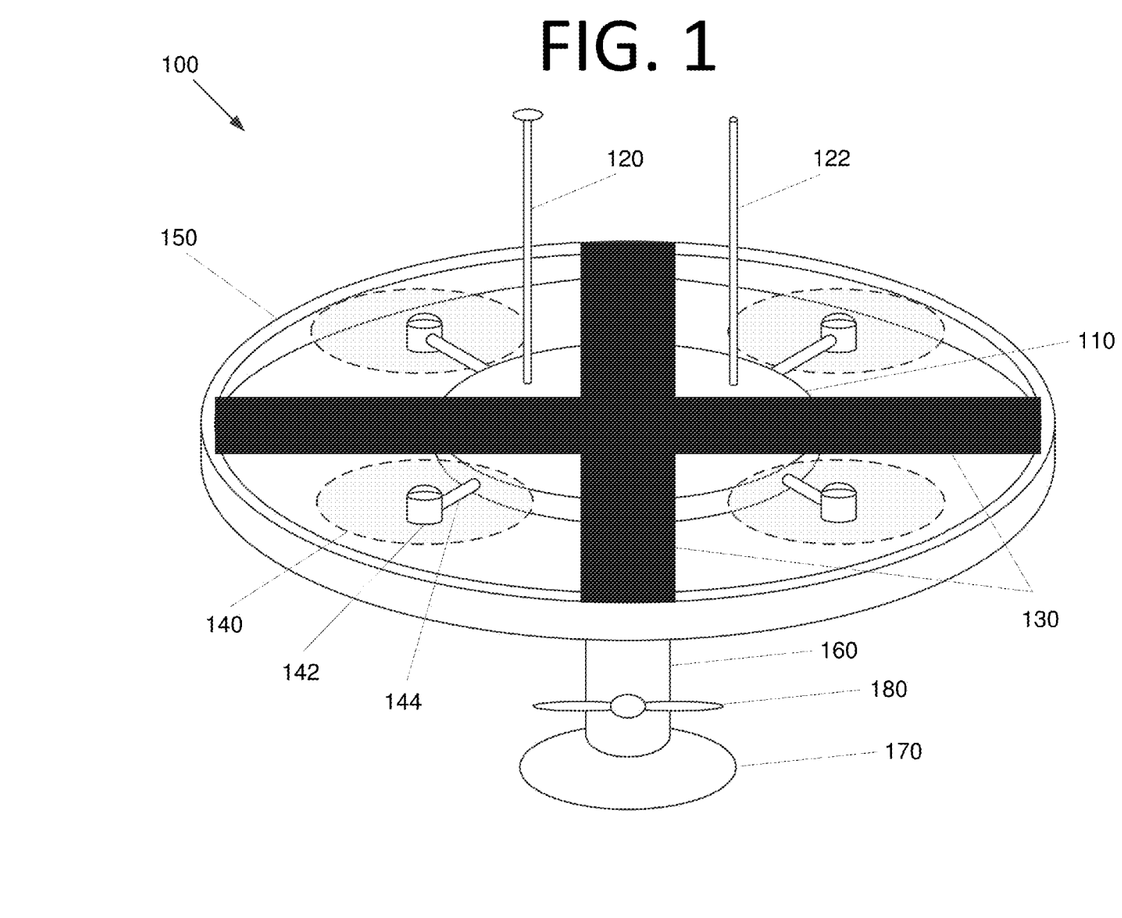
FIG. 1 is a perspective view of a hybrid mobile buoy, according to an embodiment of the present invention.

FIG. 1 is a perspective view of a hybrid mobile buoy 100, according to an embodiment of the present invention. Buoy 100 includes a buoyant body 110 that houses a computing system (not shown) that provides ocean sensing, navigation, communications, and flight control processing. In some embodiments, the computing system may be computing system 800 of FIG. 8. A hydrophone and a signal processing unit, for example, may be used to identify specific signatures of objects of interest, such as submarines, whales, fish, etc. Buoyant body 110 may include a hollow, airtight cavity (not shown) filled with air and/or another material or gas that enables flotation on water. Buoyant body 110 will generally be buoyant since weight should be reduced for feasibility of implementation. In certain embodiments, the buoyancy may be controlled by taking in/expelling water using pumps (see FIG. 9), for example. For instance, part or all of the non-component space within buoyant body 110 may be filled with foam or another buoyant material, an inert gas, and/or any other gas and/or material.

In some embodiments, buoyant body 110 may be weighted more heavily on the bottom such that it is difficult to overturn and/or self-righting. How low the center of mass should be may be determined based on the geometry of the displaced volume and the overall weight. Buoyant body 110 and any other components of buoy 100 may be constructed from plastics, foam, ceramics, metals, carbon fiber, fiberglass, wood, and/or any other material(s) as a matter of design choice. Preferably, the material(s) will not corrode or corrode slowly in a water environment. Buoy 100 may include a hydrophobic coating and/or a coating that discourages growth of sea life and/or buildup of minerals.

Antennas 120, 122 enable communications using various communication technologies. One or both of antennas 120, 122 may be configured to communicate with ships, land stations, satellites, cell phones, other buoys, and/or any other system as a matter of design choice. Any suitable communication protocol may be used, including, but not limited to, mobile ad hoc network (MANET), Wi-Fi, 802.11 family protocols, 3G, 4G, 4G LTE, Bluetooth™, Zigbee™, or any other suitable terrestrial or satellite wireless communications protocol. The computing system processes received inbound communications signals, and transmits outbound communications signals, via antennas 120, 122.

An onboard global positioning system and inertial navigation system (GPS/INS—see FIG. 8) may provide position information for buoy 100. The GPS/INS, in concert with the computing system, may carry out "autopilot" functionality that positions buoy 100 in accordance with a given mission. In other words, buoys in a swarm may be positioned in a geographic grid in any desired two dimensional pattern and spacing with respect to one another. However, it is generally preferable for each buoy to be close enough to communicate with a sufficient number of other buoys to facilitate inter-buoy communication and effective swarm operation.

An array of solar panels 130 provide power to charge one or more batteries (not shown) of buoy 100. Power management circuitry (not shown) may facilitate charging. The batteries may be housed inside buoyant cavity 110 and may be seawater-based in some embodiments. The primary batteries may have a lithium chemistry in some embodiments, and as such, should not be exposed to salt water since this makes them inert. However, there are forms of batteries for low power applications that use sea water. These may be used to maintain base functions and/or transmit a beacon if the buoy was damaged in some way. The solar panels are shown in a cross configuration here, but any suitable configuration may be used.

In one embodiment, four rotors 140 provide flight capabilities for buoy 100. Any desired number of rotors may be used as a matter of design choice in various embodiments. However, using fewer rotors may be less effective. Each rotor 140 is driven by a motor 142. In some embodiments, motor 142 may be a brushless motor, which generally does not have parts that wear and tends to be tolerant of exposure to water. Support members 144 attach rotors 140 to buoyant body 110. However, in some embodiments, rotors 140 may be attached or otherwise connected to any other component of buoy 100.

In some embodiments, rotors 140 may extend above solar array 130 to increase the surface area that is available for power generation. In certain embodiments, solar array 130 may extend outward past an external support member 150 to further increase the surface area of solar array 130. In certain embodiments, one or more additional floating members (not shown) may be attached to portions of solar array 130 that extend past external support member 150 in order to improve the buoyancy and seaworthiness of buoy 100.

Figure 2:
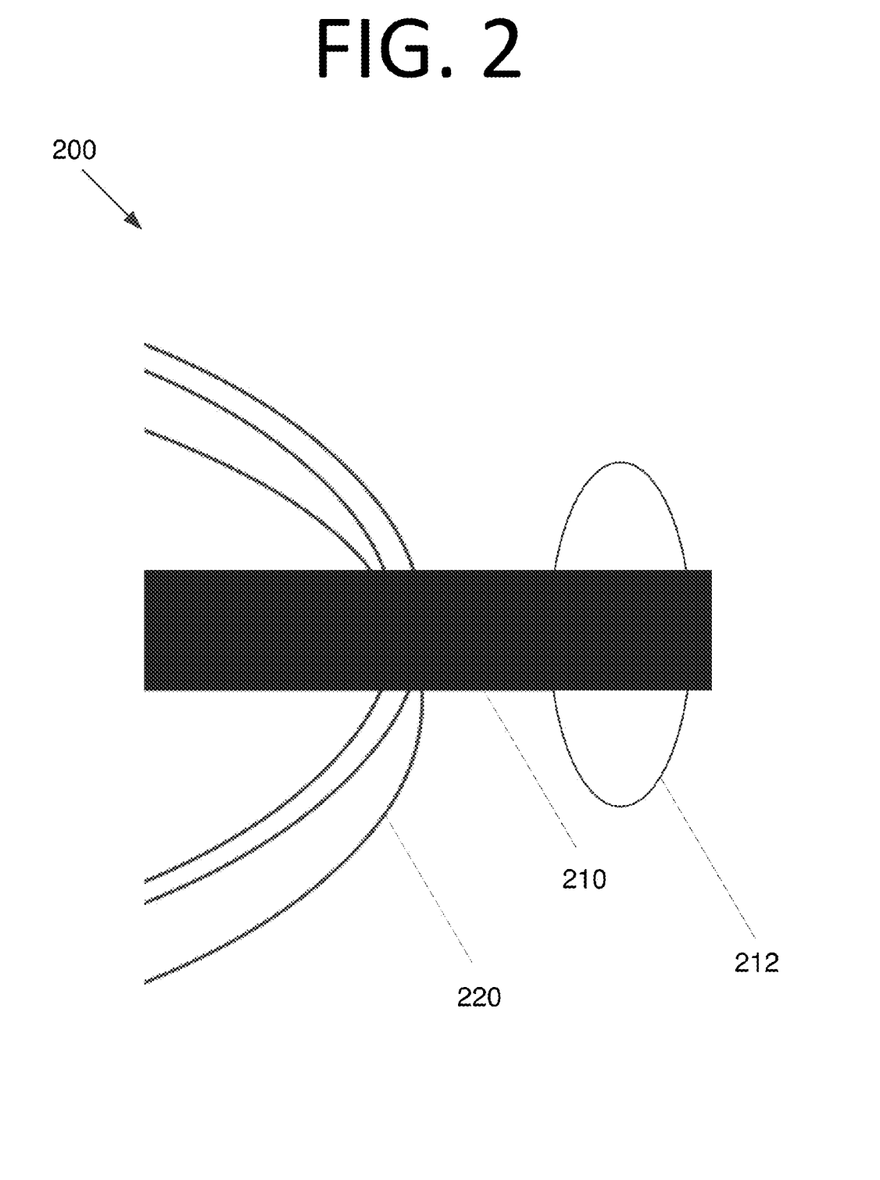
FIG. 2 is a perspective view of a hybrid mobile buoy with a solar array arm that includes a pontoon, according to an embodiment of the present invention.

Such a configuration is shown in buoy 200 of FIG. 2. Buoy 200 includes a solar array arm 210 and an external support member 220. A pontoon 212 is attached to solar array arm 210. Pontoon 212 may be filled with air, foam, or any other suitable material capable of floating on water. While pontoons are shown attached to arms of solar arrays in this embodiment, in other embodiments, pontoons may be attached to any other component or to their own arms extending outward from the buoy.

Returning to FIG. 1, external support member 150 provides a frame for buoy 100 and helps to support solar array 130. External support member 150 may also allow buoy 100 to bump into other objects without being damaged, either when flying or floating. Also, external support member 150 may serve as a rig for supporting certain sensing payloads that can be lowered into the water on a thin cable (not shown), for example. If buoy 100 is tumbled in heavy seas, external support member 150 may help to prevent the cables from getting tangled in rotors 140 or in other components of buoy 100. In some embodiments, external support member 150 may be connected to rotors 140 and/or buoyant body 110. In certain embodiments, an external support member may not be present.

In one embodiment, a sensor support member 160 is attached to buoyant body 110 and extends under the water. In some embodiments, sensor support member 160 may be configured to fold next to buoyant body 110 such that buoy 100 is more aerodynamic during flight. Sensor support member 160 is attached to and supports sensor 170, which may be a hydrophone or any other suitable sensor. A propeller 180 provides propulsion for buoy 100 when water navigation is desired. While generally slower, propulsion while floating may require less power than flight, which may be useful when the sun is hidden and/or when more rapid movement is not required.

In addition to, or in lieu of, solar array 130, power may be generated by other mechanisms. For instance, a fan (not shown) extending above buoy 100 from any desired attachment location may capture wind energy to charge the batteries. See FIG. 3. The fan may be configured to fold next to buoy 100 to improve flight aerodynamics. These mechanisms may generate less power than a solar array, but may be useful to provide alternative or auxiliary power to drive any propulsion system of buoy 100.

In an alternative embodiment, instead of using a fan, buoy 100 may be landed on a beach or other solid surface and rotors 140 may be angled into the prevailing wind to generate power. In such embodiments, rotors 140 would include generators and would be wired to power the batteries. This may be similar in principle to regenerative braking in a hybrid car.

Figure 3:
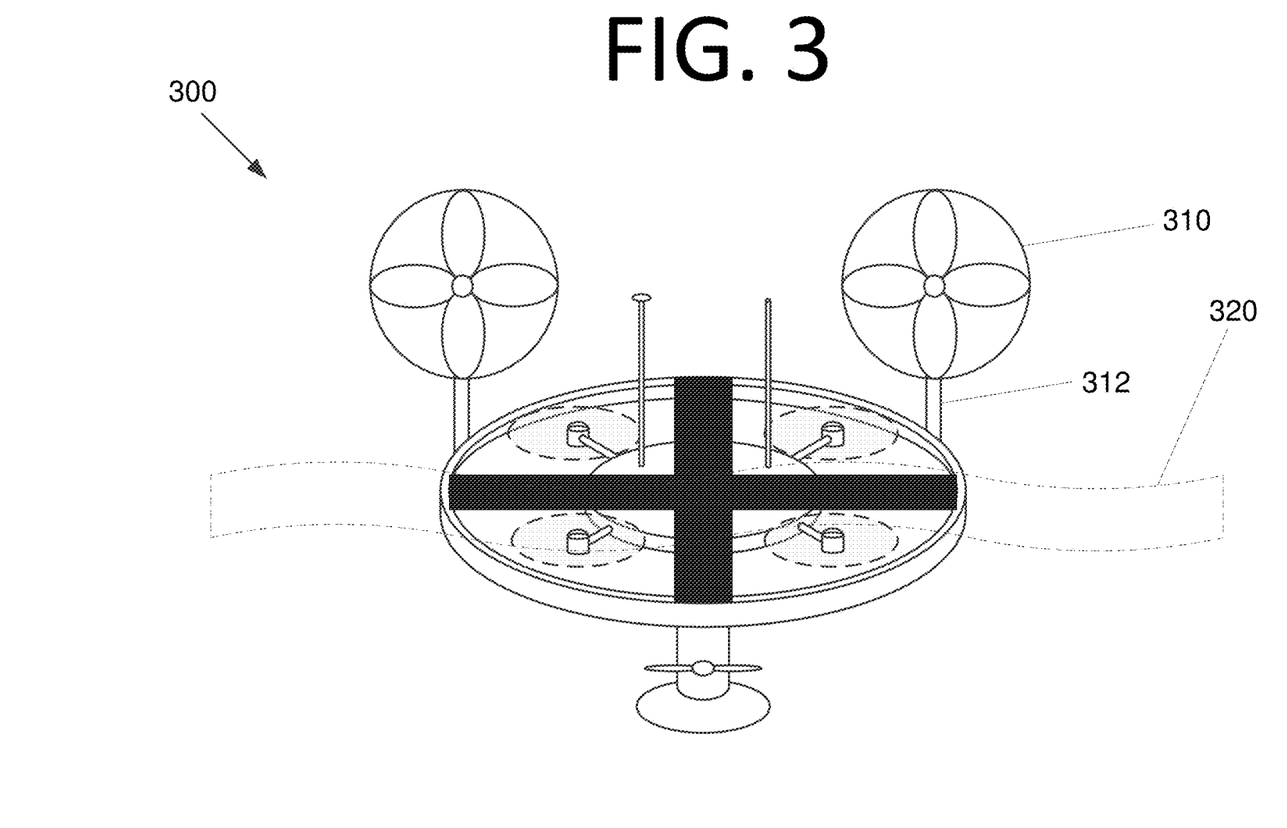
FIG. 3 is a perspective view of a hybrid mobile buoy with fans, according to an embodiment of the present invention.

FIG. 3 is a perspective view of a hybrid mobile buoy 300 with fans 310, according to an embodiment of the present invention. Fans 310 extend above the surface of water 320 via support members 312. Fans 310 and/or support members 312 may be configured to rotate when driven by the wind such that they are facing in the direction of the wind and are optimally driven thereby.

Figure 4:
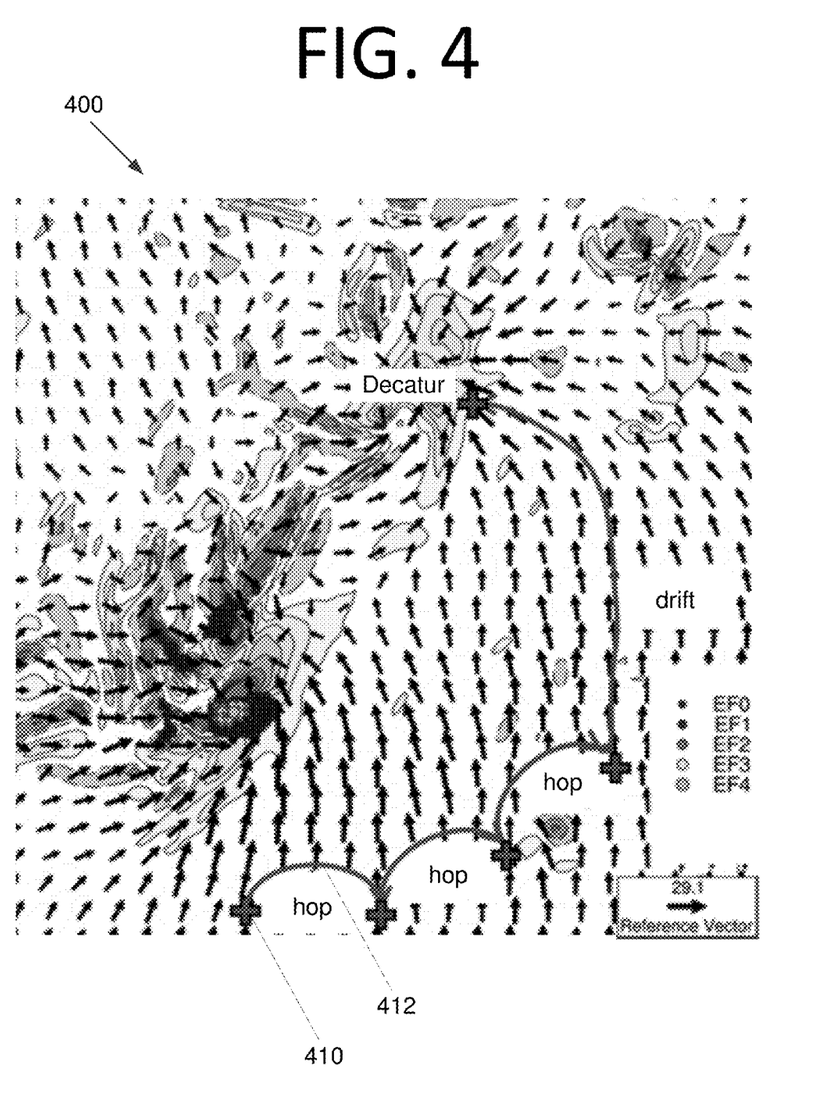
FIG. 4 is a map illustrating a travel path of a hybrid mobile buoy, according to an embodiment of the present invention.

FIG. 4 is a map 400 illustrating a travel path of a hybrid mobile buoy, according to an embodiment of the present invention. The complex path consists of the hopping segments performed in the air and the drifting segment that utilizes natural ocean currents. Plus symbols 410 represent endpoint locations of the buoy between flight (i.e., hops) and drift segments. The ability to communicate with neighboring buoys makes some embodiments capable of optimizing individual buoy paths by integrating prior geographical information (e.g., a map of obstacles such as islands and the shoreline) and current information (e.g., active measurements of currents performed by the swarm) pertaining to the operational environment. Path optimization (e.g., for minimum energy expenditures) may amplify the endurance of each unit and enhance the utility of the swarm. Line 412 illustrates the travel path of the buoy, such as buoy 100. In one embodiment, the buoy can fly for relatively short distances or drift in accordance with mission requirements. In certain embodiments, the buoy may also be capable of being propelled while floating on the water.

Figure 5:
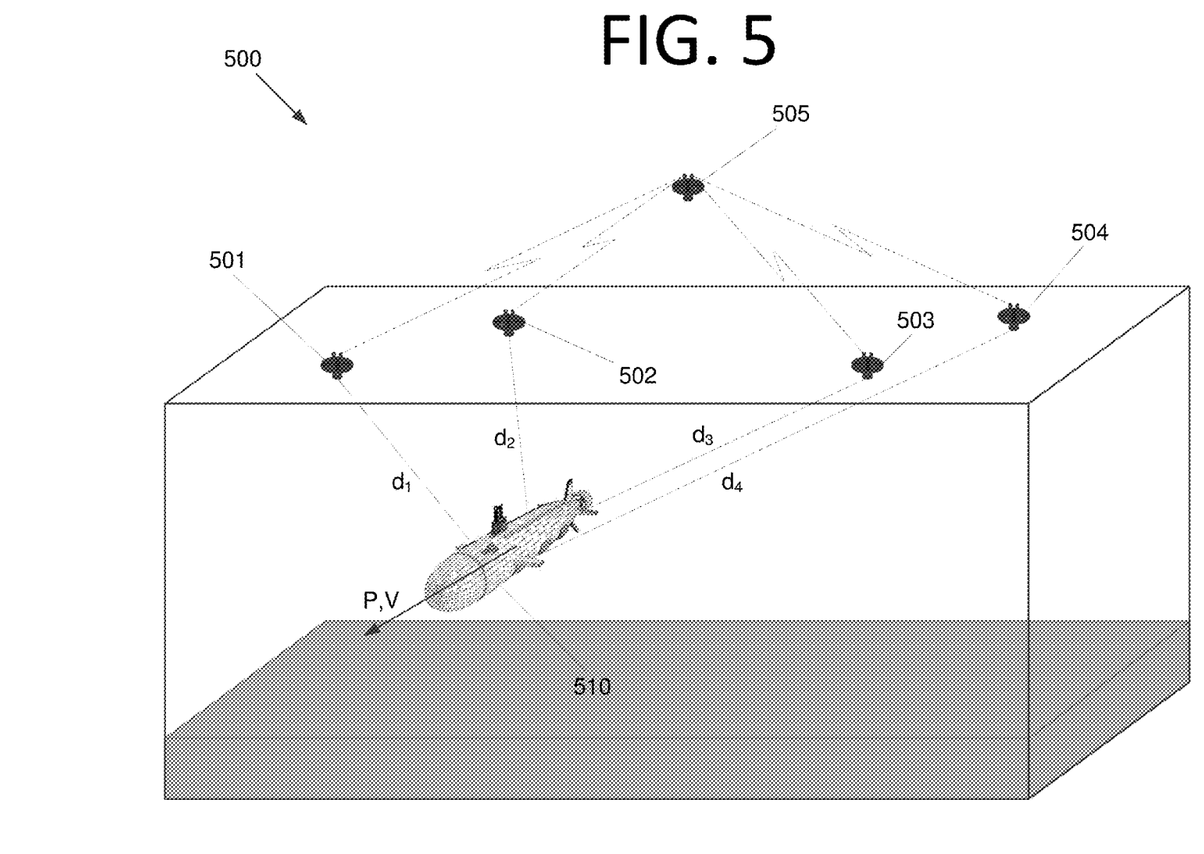
FIG. 5 is a schematic diagram of a buoy swarm engaged in submarine detection, according to an embodiment of the present invention.

FIG. 5 is a schematic diagram 500 of a buoy swarm, buoys 501-505, engaged in submarine detection, according to an embodiment of the present invention. Buoys 501-505 are engaged in tracking submarine 510. "Engaged" means that submarine 510 is detected by at least one buoy based on its electromagnetic or sound signature. When a submarine is detected in some embodiments, the buoy can go into an airborne mode for a short period of time to communicate submarine detection to other nearby units that might be hibernating in order to preserve power. This may initiate the active engagement of a swarm that does not need to travel with the speed of the identified submarine. Timely communicated detection may be a prime utility value of some embodiments of the swarm.

Returning to FIG. 5, buoy 501 detects that it is at distance $d_1$ from submarine 510, buoy 502 detects that it is at distance $d_2$ from submarine 510, buoy 503 detects that it is at distance $d_3$ from submarine 510, and buoy 504 detects that it is at distance $d_4$ from submarine 510. From these distances and the known locations of buoys 501-504, the position P and direction vector V of submarine 510 can be determined. Buoy 505 is currently flying such that it can better communicate with external systems such as satellites and ships. Buoy 505 receives the distance data from floating buoys 501-504 and relays this data, as well as the position and direction vector information of submarine 510, to the external systems.

As can be seen in FIG. 5, a "swarm" of mobile buoys may be used to detect mobile underwater objects, such as submarines, submersed UAVs, fish, whales, etc. In certain embodiments, only the minimum number of buoys for tracking an object of interest may be deployed in order to save cost. This minimum number may be based on one or more of a distance at which buoys can detect objects, a distance at which buoys can communicate with one another, the average speed of the object to be tracked, the distance buoys can travel in a predetermined timeframe with a certain power level, or any other desired factor(s).

In some instances, it may not be possible for small flying buoys to keep pace with faster underwater objects. However, such buoys can still estimate speed, heading, and position. Furthermore, a large swarm of such buoys may be capable of tracking faster objects over large distances.

In swarm embodiments, individual buoys may communicate with one another to establish the direction, speed, and depth of underwater objects. While active sonar may be used, many embodiments may use passive sensors and sensing techniques since these sensors tend to be smaller, lighter, and require less power. Passive sensors may also be capable of inferring size based on signal strength, but would likely not be capable of producing a sonar-like estimate of vehicle shape and size.

Buoys may collectively move to track and match pace with a given object. Alternatively, certain buoys may be capable of flying and others may not. Buoys with a flying configuration may match pace with, and follow the underwater object and those without such a configuration may communicate with flying buoys. Buoys that do not fly may be larger and have more advanced sensing equipment. Flying buoys may be designed to increase flying range and/or speed. In certain embodiments, flying buoys may lack equipment other than that required for flight and communications. When buoys are specialized, they may detect different frequency ranges, use different sensing technologies, and or have any other equipment package as a matter of design choice.

In some embodiments, a swarm of buoys may only need one or several buoys in flight at any given time to provide effective communications. Also, there may be various sensors with each buoy carrying just one or a few in certain embodiments. Loss of a single buoy in a large swarm would not significantly degrade the capabilities of the entire swarm, and the swarm as a whole degrades gracefully if buoys are lost or damaged. Furthermore, lost or damaged buoys could be periodically replaced or repaired to maintain system capabilities.

Figure 6:
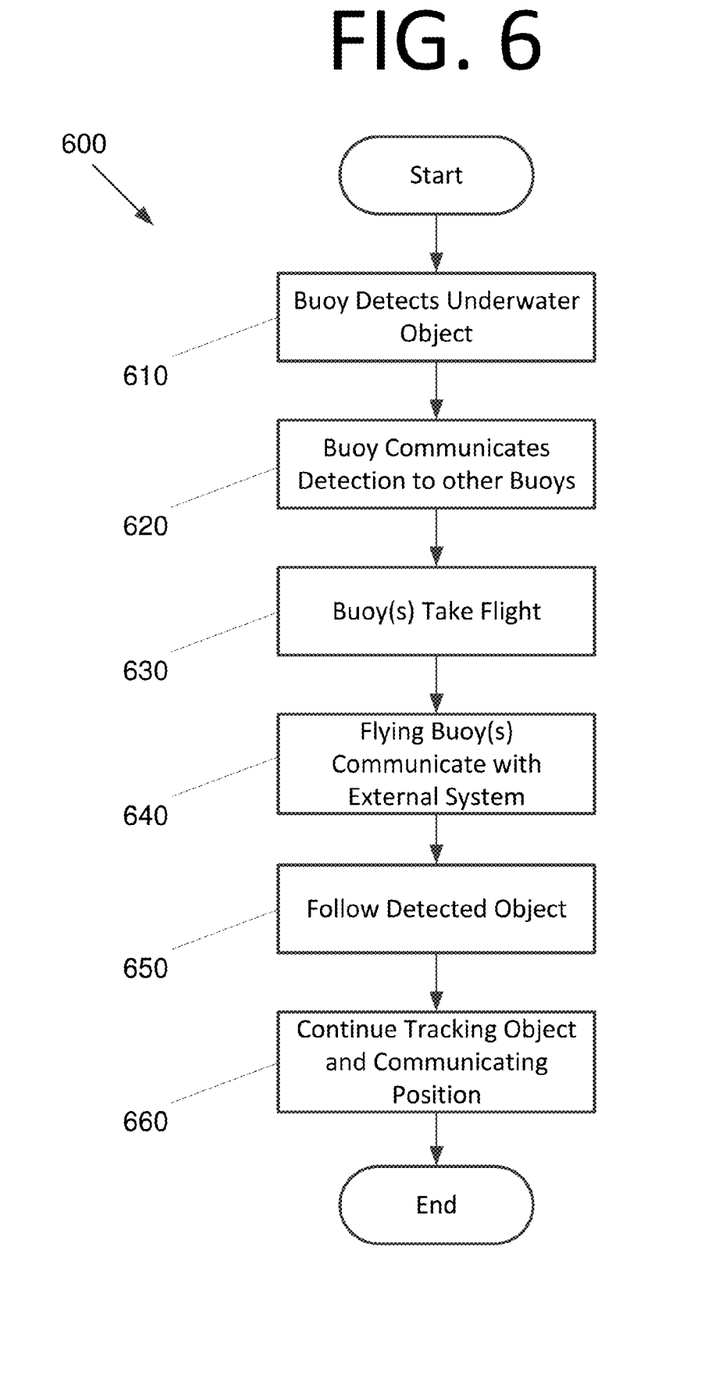
FIG. 6 is a flowchart illustrating a process for tracking underwater objects using a fleet of mobile buoys, according to an embodiment of the present invention.

FIG. 6 is a flowchart 600 illustrating a process for tracking underwater objects using a swarm of mobile buoys, according to an embodiment of the present invention. The process begins with at least one buoy detecting an underwater object at 610. The detecting buoy then communicates with other buoys to inform them that the object was detected at 620. At least one buoy takes flight at 630. In some embodiments, steps 620 and 630 may be performed in reverse. At least one flying buoy then communicates with external systems, such as satellites, ships, land stations, etc. to inform them that the object was detected at 640.

At least one flying buoy follows the detected object at 650. As discussed above, in some embodiments, the buoy may not be able to match the pace and distance traveled by the detected object. In such embodiments, new buoys in the swarm may join in tracking the object when it comes within range. Also, buoys may stop detection when the object travels out of their range. In certain embodiments, buoys may not pursue the object, but may instead rely on the positioning of the swarm to handoff detection duties and collectively track the object. The swarm of buoys then tracks the object and communicates its position to the external system as the object travels at 660.

In some embodiments, all of the buoys in the swarm on the surface that are within range can detect the presence of the target object, but they can only estimate position by comparing times of detection along with their own locations very accurately. Accordingly, at least one buoy may always be in the air to communicate with all of the buoys on the water within a certain range. All buoys may have GPS, which would allow sensory data to be accurately time-stamped.

In certain embodiments, rather than having a buoy in the air at all times, all buoys may be in the water sensing. When the "event" is over, or after a certain period of time, one buoy may fly into the air to share data with external systems and allow for calculations to commence. The buoy in the air may not have to perform the calculations. Instead, the flying buoy may just allow for the sharing of time-stamped data among the buoys in range. This type of calculation is also known as time-delay on arrival (TDOA).

Figure 7:
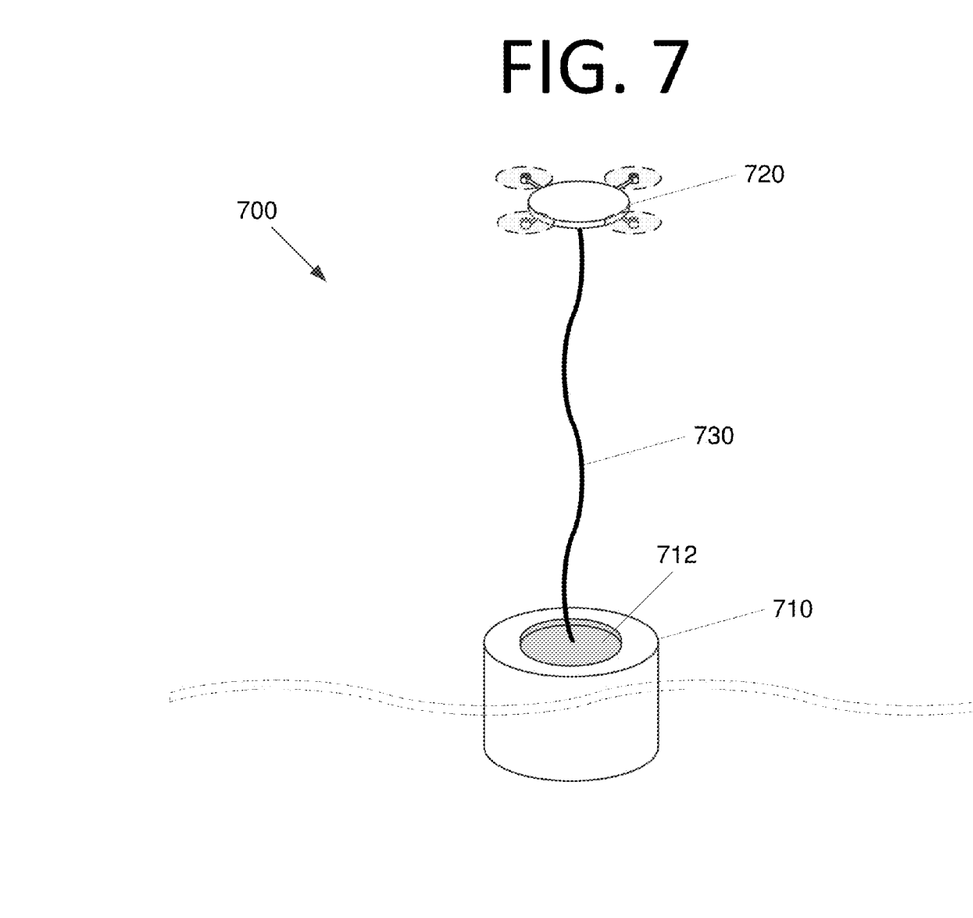
FIG. 7 is a side view of a buoy system with a floating buoy and a deployed flying multi-rotor, according to an embodiment of the present invention.

FIG. 7 is a side view of a buoy system 700 with a floating buoy 710 and a deployed flying multi-rotor 720, according to an embodiment of the present invention. Multi-rotor 720 is tethered to floating buoy 710 via tether 730. Tether 730 may be any desired length, and may be several hundred feet or more in some embodiments to facilitate sensing and communications via antennas (not shown) of multi-rotor 720. Tether 730 may include wires enabling communications between multi-rotor 720 and floating buoy 710, or communication may be wireless. A recess 712 allows multi-rotor 720 to rest on, and dock with, floating buoy 710. Fasteners, clamps, locks, or any other suitable mechanism (not shown) may hold multi-rotor 720 within recess 712 when it is not flying. A motor and spool (not shown) within floating buoy 710 may wind, unwind, and store tether 730 in some embodiments.

In some embodiments, floating buoy 710 may have any of the non-flight components discussed herein, and may have larger batteries, more extensive solar arrays, and more powerful computing systems since it does not need to fly, which generally lends itself to a smaller size and lighter weight. In certain embodiments, floating buoy 710 may power multi-rotor 720 via tether 730. If floating buoy 710 is large enough, it may be able to power flight of multi-rotor 720 for longer periods of time, or even continually. Multi-rotor 720 may also provide low altitude atmospheric sensing in certain embodiments.

Figure 8:
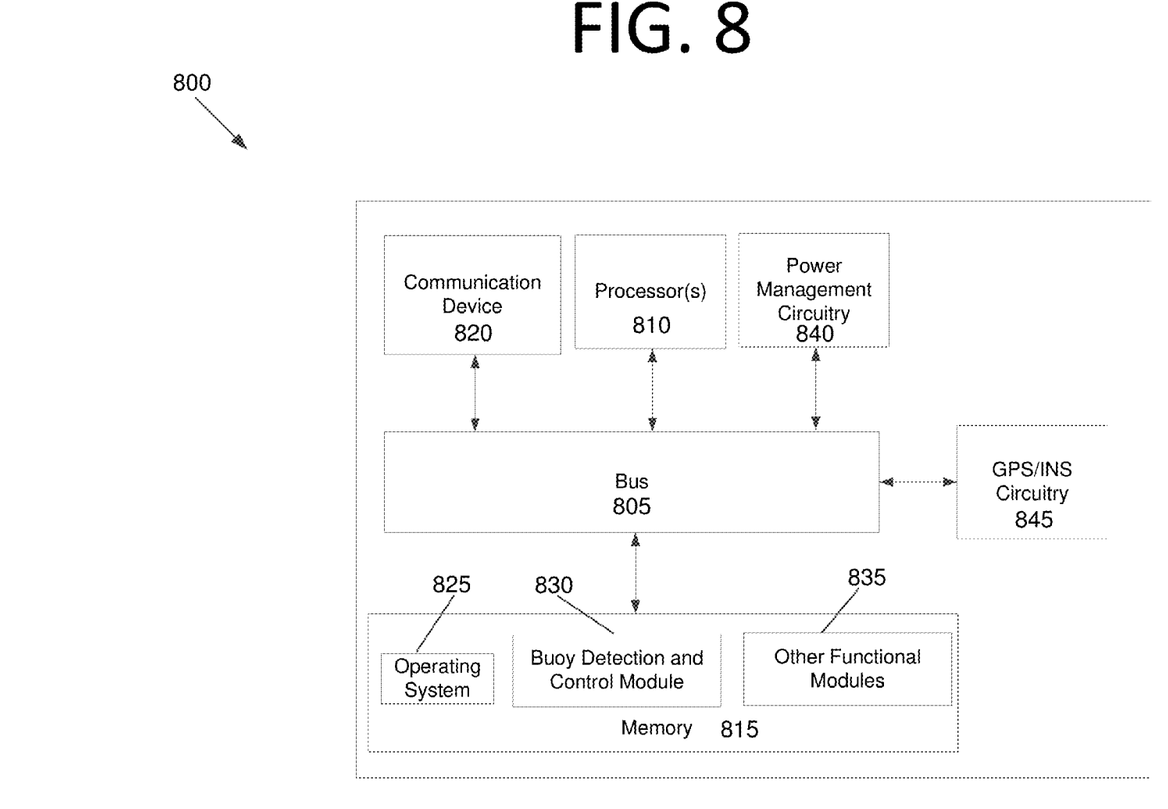
FIG. 8 is a block diagram of a computing system configured to control a mobile buoy, according to an embodiment of the present invention.

FIG. 8 is a block diagram of a computing system 800 configured to control a mobile buoy, according to an embodiment of the present invention. Computing system 800 includes a bus 805 or other communication mechanism for communicating information, and processor(s) 810 coupled to bus 805 for processing information. Processor(s) 810 may be any type of general or specific purpose processor, including a central processing unit ("CPU") or application specific integrated circuit ("ASIC"). Processor(s) 810 may also have multiple processing cores, and at least some of the cores may be configured to perform specific functions. Computing system 800 further includes a memory 815 for storing information and instructions to be executed by processor(s) 810. Memory 815 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 800 includes a communication device 820, such as a transceiver and antenna, to wirelessly provide access to a communications network.

Non-transitory computer-readable media may be any available media that can be accessed by processor(s) 810 and may include both volatile and non-volatile media, removable and non-removable media, and communication media. Communication media may include computer-readable instructions, data structures, program modules or other transport mechanism and includes any information delivery media.

Memory 815 stores software modules that provide functionality when executed by processor(s) 810. The modules include an operating system 825 for computing system 800. The modules further include a buoy detection and control module 830 that is configured to detect underwater objects and control operation of the buoy. Computing system 800 may include one or more additional functional modules 835 that include additional functionality. Power management circuitry 840 is responsible for accumulation of energy from solar panels and its distribution to the onboard instrumentation and the propulsion that enables aerial mobility (e.g., rotors) in this embodiment. GPS/INS 845 provides position information for computing system 800 in this embodiment.

One skilled in the art will appreciate that a "system" could be embodied as an embedded system, a personal computer, a server, a console, a personal digital assistant ("PDA"), a cell phone, a tablet computing device, or any other suitable computing device, or combination of devices, capable of providing processing functionality for the buoy. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 9:
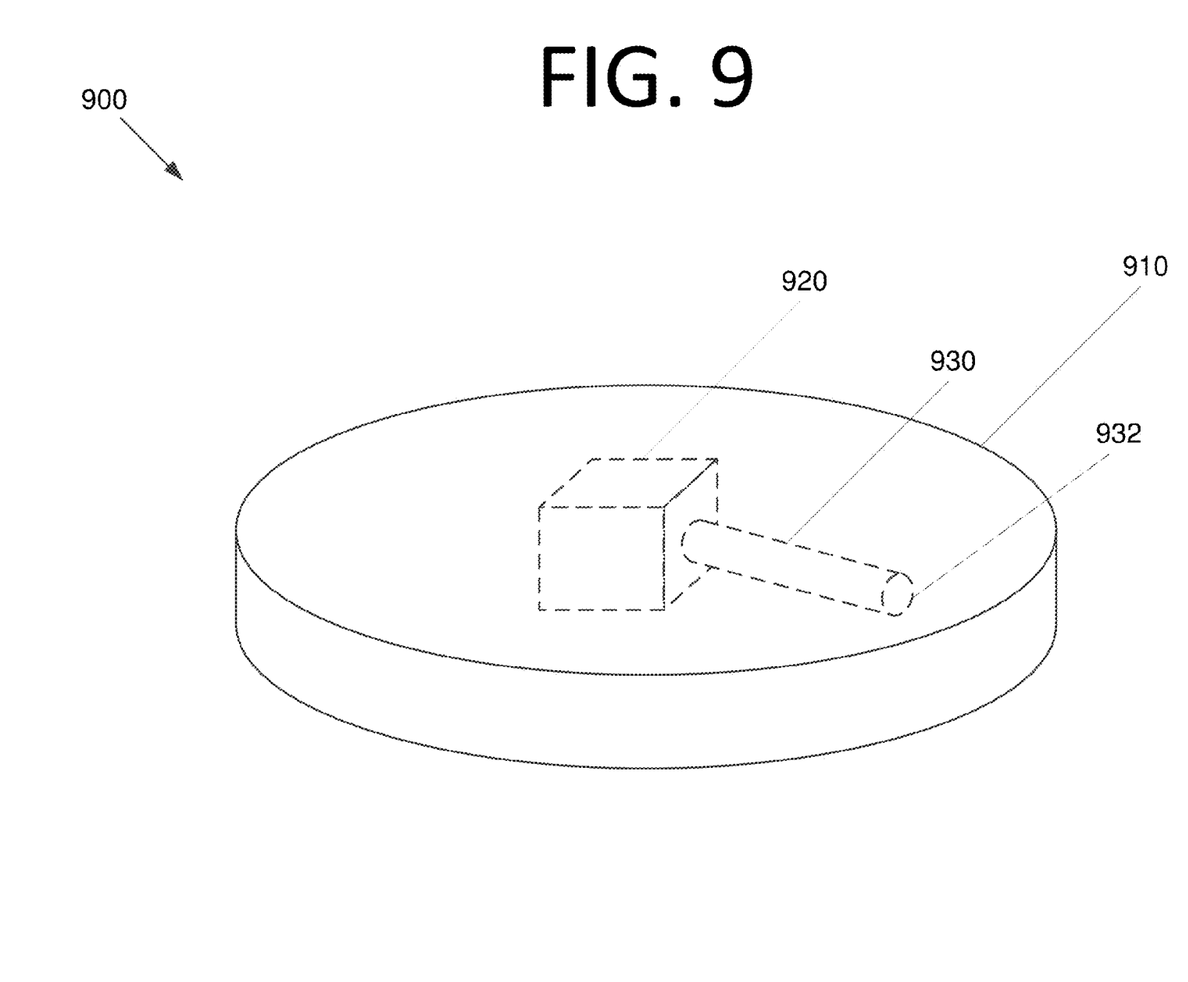
FIG. 9 is a perspective view of a buoyant member with a pump, according to an embodiment of the present invention.

FIG. 9 is a perspective view 900 of a buoyant body 910 with a pump 920, according to an embodiment of the present invention. Pump 920 pumps water into and out of buoyant body 910 via pipe 930 with an opening 932 on the bottom of buoyant body 910. However, any number of pumps and pipes having any location within buoyant body 910 may be used.

The process steps performed in FIG. 6 may be performed by a computer program, encoding instructions for the processor, for example, processor 810, to perform at least the process described in FIG. 6, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the processor to implement the process described in FIG. 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It will be understood that many additional changes in the details, materials, procedures and arrangement of parts, which have been herein described and illustrated to explain the nature of the invention, may be made by those skilled in the art within the principal and scope of the invention as expressed in the appended claims.

The invention claimed is:

1. An apparatus, comprising:
a buoyant body configured to float on water;
a battery;
an array of solar panels and power management circuitry configured to charge the battery;
a sensor configured to detect underwater objects;
at least one propeller or rotor configured to cause the apparatus to fly; and
a computing system configured to facilitate communication with other buoys, conduct underwater sensing, and control motion of the apparatus, wherein the computing system is configured to cause the apparatus to fly to keep pace with an underwater object.

2. The apparatus of claim 1, further comprising:
an onboard global positioning system and inertial navigation system (GPS/INS) configured to determine a position of the apparatus and the computing system configured to receive position information from the GPS/INS and control the position of the apparatus via the at least one propeller or rotor.

3. The apparatus of claim 1, wherein the computing system is further configured to cause the apparatus to fly to a predetermined height and communicate with external systems and/or other buoys.

4. The apparatus of claim 1, wherein the apparatus further comprises a pontoon attached to a buoy component or arm that extends past the body of the apparatus.

5. The apparatus of claim 1, further comprising:
a propeller configured to propel the apparatus when floating on the water.

6. The apparatus of claim 1, further comprising:
at least one pump configured to pump water into and out of the buoyant body to change a buoyancy of the buoyant body.

7. The apparatus of claim 1, further comprising:
a fan configured to charge the battery via a generator utilizing wind.

8. The apparatus of claim 1, further comprising:
an external support member configured to protect the apparatus from running into objects; and
at least one additional sensor extending from the external support member.

9. A method, comprising:
detecting an underwater object with a first buoy;
communicating from the first buoy to a plurality of other buoys that the object was detected;
flying the first buoy or another buoy to a predetermined height, thereby generating a flying buoy;
communicating from by the flying buoy to an external system that the object was detected;
joining new buoys in tracking the object when the object moves into range of the new buoys; and
terminating tracking of the object by buoys when the object moves out of range.

10. The method of claim 9, further comprising:
flying the flying buoy in a direction of travel of the detected object.

11. The method of claim 9, further comprising:
tracking using by a plurality of buoys a position of the detected object as it travels;
receiving at the flying buoy information pertaining to the object's position; and
communicating from the flying buoy the information pertaining to the object's position to the external system.

12. The method of claim 9 wherein the flying buoy comprises:
a buoyant body configured to float on water;
a battery;
an array of solar panels and power management circuitry configured to charge the battery;
a sensor configured to detect underwater objects; and
at least one propeller or rotor configured to cause the apparatus to fly.

13. The method of claim 12 wherein the flying buoy further comprises:
an onboard global positioning system and inertial navigation system (GPS/INS) configured to determine a position of the apparatus; and a computing system configured to receive position information from the GPS/INS and control the position of the apparatus via the at least one propeller or rotor.

14. The method of claim 13 wherein the flying buoy further comprises:
a computing system configured to facilitate communication with other buoys, conduct underwater sensing, and control motion of the apparatus.

15. A flying buoy comprising:
a buoyant body configured to float on water;
a sensor support member having a first end and a second end, where the first end is attached to the buoyant body, and where the sensor support member is attached to the buoyant body such that the sensor support member extends under the water when the buoyant body floats on water and the second end of the sensor support member is under the water when the buoyant body floats on water;
a sensor attached to the second end of the sensor support member and displaced from the buoyant body such that the sensor is under the water when the buoyant body floats on water; and
a plurality of rotors where each rotor in the plurality of rotors is fixably attached to the buoyant body such that the each rotor is above the water when the buoyant body floats on water, and where the each rotor is oriented to direct a thrust in a direction away from a surface of the water when the buoyant body floats on water.

16. The flying buoy of claim 15 where the each rotor is further oriented to direct the thrust in a direction from the sensor to the buoyant body when the buoyant body floats on water.

* * * * *